R. HUFF.
UNIVERSAL JOINT.
APPLICATION FILED JUNE 27, 1906.
1,015,267.
Patented Jan. 16, 1912.
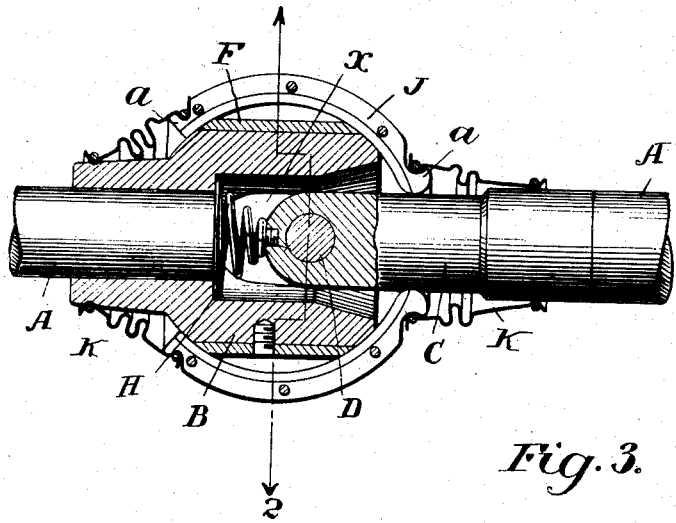
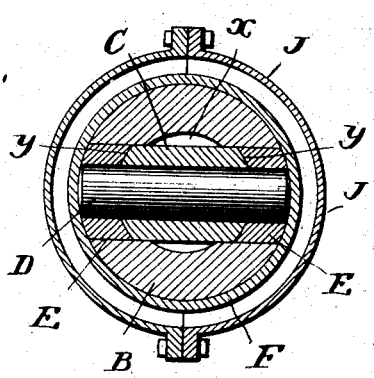
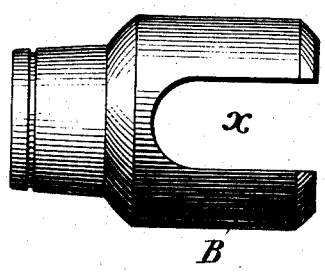
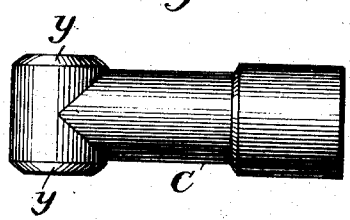
Witnesses
Inventor
Russell Huff
by Foster, Freeman & Watson
Attorneys

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

UNIVERSAL JOINT.

1,015,267. Specification of Letters Patent. Patented Jan. 16, 1912.

Application filed June 27, 1906. Serial No. 323,604.

*To all whom it may concern:*

Be it known that I, RUSSELL HUFF, a citizen of the United States, residing at Detroit, in the county of Wayne and State of Michigan, have invented certain new and useful Improvements in Universal Joints, of which the following is a specification.

My invention relates to universal joints, and consists of a joint so constructed as to permit a certain amount of end play of the shaft sections connected by the joints, in means for excluding dust and grit and maintaining the lubricant in contact with the joint, as fully set forth hereinafter and as illustrated in the accompanying drawing, in which,—

Figure 1 is a longitudinal section showing my improved joint as applied to two sections of a shaft; Fig. 2 is a transverse section on the line 2, Fig. 1; Fig. 3 is an outside view of one member of the joint; and Fig. 4 an outside view of the other member of the joint.

The two members B, C are adapted for attachment to the sections A, A' of the shaft, the outer member B being keyed or otherwise secured to the section A, and the inner member C being socketed at one end to receive the end of the section A', to which it is firmly attached. The member B has a central recess $x$ adapted to receive the end of the member C, being preferably widened or expanded at the outer end to permit the member C to be brought at an angle to the member B within said recess, and at opposite sides of the recess $x$ the member B is slotted, the said slots, as shown best in Fig. 3, extending to the outer end of the member B, although this is not essential, and into said slots extend the ends of a pin D which is seated transversely in the end of the member C. The ends of this pin may fit the slots in the member B, but preferably, and as shown, an antifriction roller E is fitted to rotate about each end of the pin D within the adjacent slot and has a concave inner face adapted to receive the concave outer face of a boss $y$ upon the member C. A spring H within the recess $x$, and bearing against the end of the recess or on the end of the power shaft A, also bears against the end of the member C and tends to hold the two members in proper relation to each other. This spring is not under tension when the parts are in the relative position shown in Fig. 1. To confine the rollers E, E in place a sleeve F incloses and is secured to the member B, and the rollers E, E, have convex outer faces conforming to the curved inner face of the sleeve, and which also permit the play of the member C as it takes positions at an angle to the axis of the member B.

By the arrangement of parts above set forth the one member may be set at any desired angle to the other, and the two members may rotate together in their angular positions, as in ordinary forms of universal joints, but the construction set forth has advantages in various applications, as for instance, in connection with motor vehicles where the distance between the centers of the joints of the sectional shafts varies, as for instance, when the bearings of one shaft are upon the body and other upon the running gear frame of the vehicle, the cross pins sliding in such case in the slide slots and permitting the requisite change of position of the two shaft sections. The arrangement is further advantageous in avoiding the necessity of nice fitting of the bearings of the two sections even when one does not play in respect to the other.

In the use of universal joints where it is essential to maintain the joints well lubricated and where flexible covers are employed about the joints, the said covers are apt to be broken by the projection of the oil and grease violently against the inside of said covers, due to centrifugal action. To avoid this result I make use of a rigid cover J, preferably of metal, adapted to inclose the outer member B and preferably in the form of a hollow spherical casing seated upon a spherical portion of the member B so as to play freely about the latter, and recessed for the passage of one end of the member B and the member C, as shown. When made of metal, the casing may consist of a plurality of flanged parts the flanges connected by bolts or rivets, and preferably there is a neck $a$ around each opening or recess in the casing to which may be attached one end of a flexible extensible sleeve K of rubber fabric, or other suitable material which is attached at the other end to the outside of the adjacent member and which will permit the requisite play of the parts in respect to each other while practically inclosing the two members of the joint so that the lubricant applied thereto cannot possibly escape.

In use the angular motion of one shaft section in respect to the other will simply cause a play of the casing about the outside member, while any end motion of the parts will be permitted without strain upon the casing or the sleeves. The casing cannot be burst by the projection of lubricant against the same, and the tendency of the lubricant will be to collect in the casing and not to be projected against the flexible sleeves, which also serve to exclude dust and grit. The casing rotates with the joint and hence it offers no resistance to the rotation of the shaft members.

Without limiting myself to the details of construction shown, I claim:

1. In a universal joint, the combination with the rotating members thereof, of a rigid spherical casing movably fitted to one of said members and having engagement therewith in zones on opposite sides of a central plane and also having an opening through which the other of said members extends, and said casing extending in both directions beyond the connections between said members and inclosing the same, for the purpose set forth.

2. In a universal joint, the combination with the two rotating members thereof, of a rigid spherical casing movably fitted to one of said members and having engagement therewith in zones on opposite sides of a central plane and also having an opening through which the other of said members extends, said second member fitting said opening and adapted to slide therein, and said casing extending in both directions beyond the connections between said members and inclosing the same, for the purpose set forth.

3. In a universal joint, the combination with the two rotating members thereof, of a rigid spherical casing movably fitted to one of said members and rotating therewith and having an opening through which the other member extends, said casing extending in both directions beyond the joint and inclosing the same, and flexible dust guards connected to said casing and to each of said members, for the purpose set forth.

4. In a universal joint, the combination with the two rotating members thereof, of a rigid spherical casing movably fitted to one of said members and having engagement therewith in zones on opposite sides of a central plane and also having an opening through which the other of said members extends, and said casing comprising a plurality of sections secured together and extending in both directions beyond the connections between said members and inclosing the same for the purpose set forth.

5. The combination with two shaft sections, of a universal coupling for said shaft sections, and a spherical casing surrounding said coupling and rotating therewith and having a universal movement on one member thereof and a sliding movement with respect to the other member, said casing extending in both directions beyond the joint and inclosing the same, for the purpose set forth.

6. The combination with two shaft sections, of a universal coupling for said shaft sections, a spherical casing surrounding said coupling and rotating therewith and having a universal movement on one member thereof and a sliding movement with respect to the other member, said casing extending in both directions beyond the joint and inclosing the same, for the purpose set forth.

In testimony whereof I affix my signature in presence of two witnesses.

RUSSELL HUFF.

Witnesses:
  MARK C. TAYLOR,
  H. M. ALLISON.